May 29, 1928.
J. H. SPANGLER
1,671,323
SPEED CONTROL DEVICE FOR MOTOR VEHICLES
Filed May 4, 1925     7 Sheets-Sheet 1
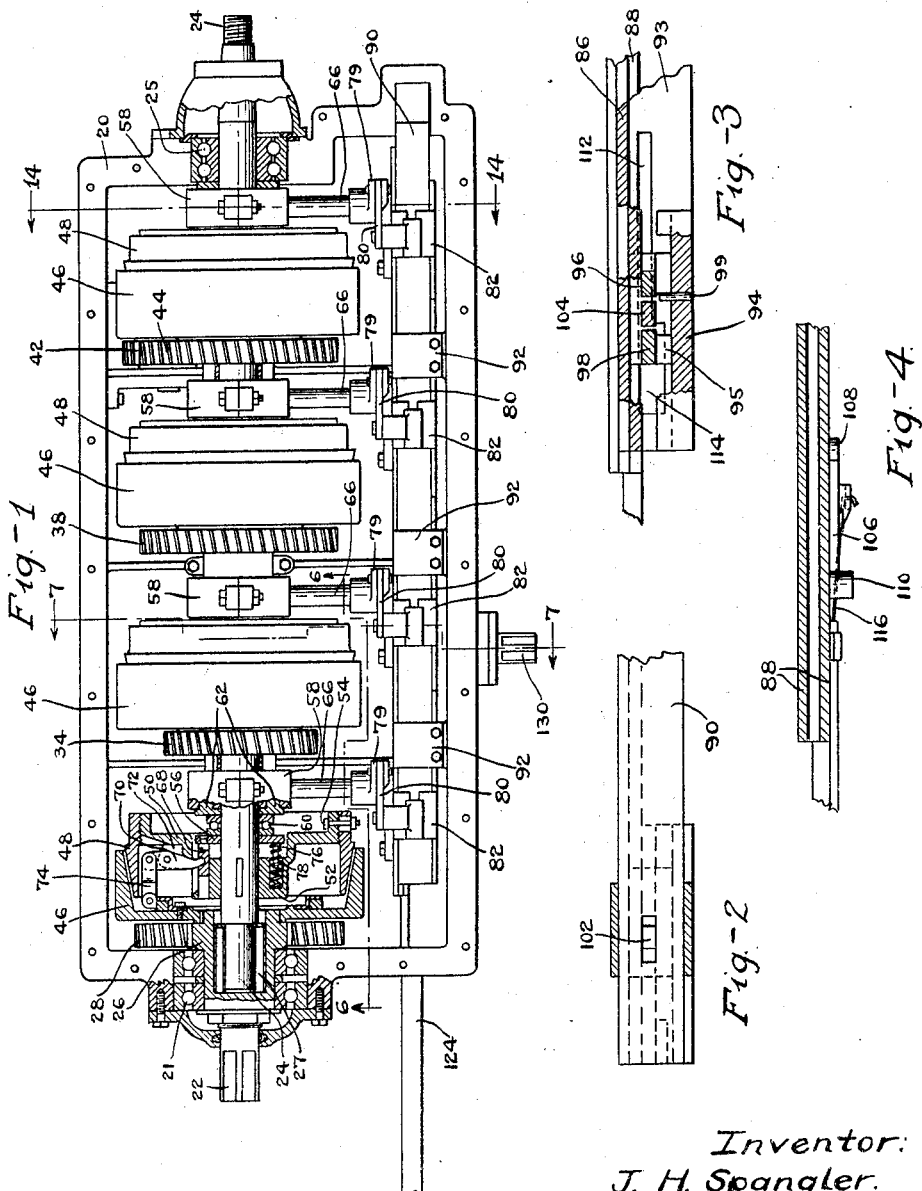
Inventor:
J. H. Spangler.
By Whiteley and Ruckman
Attorneys.

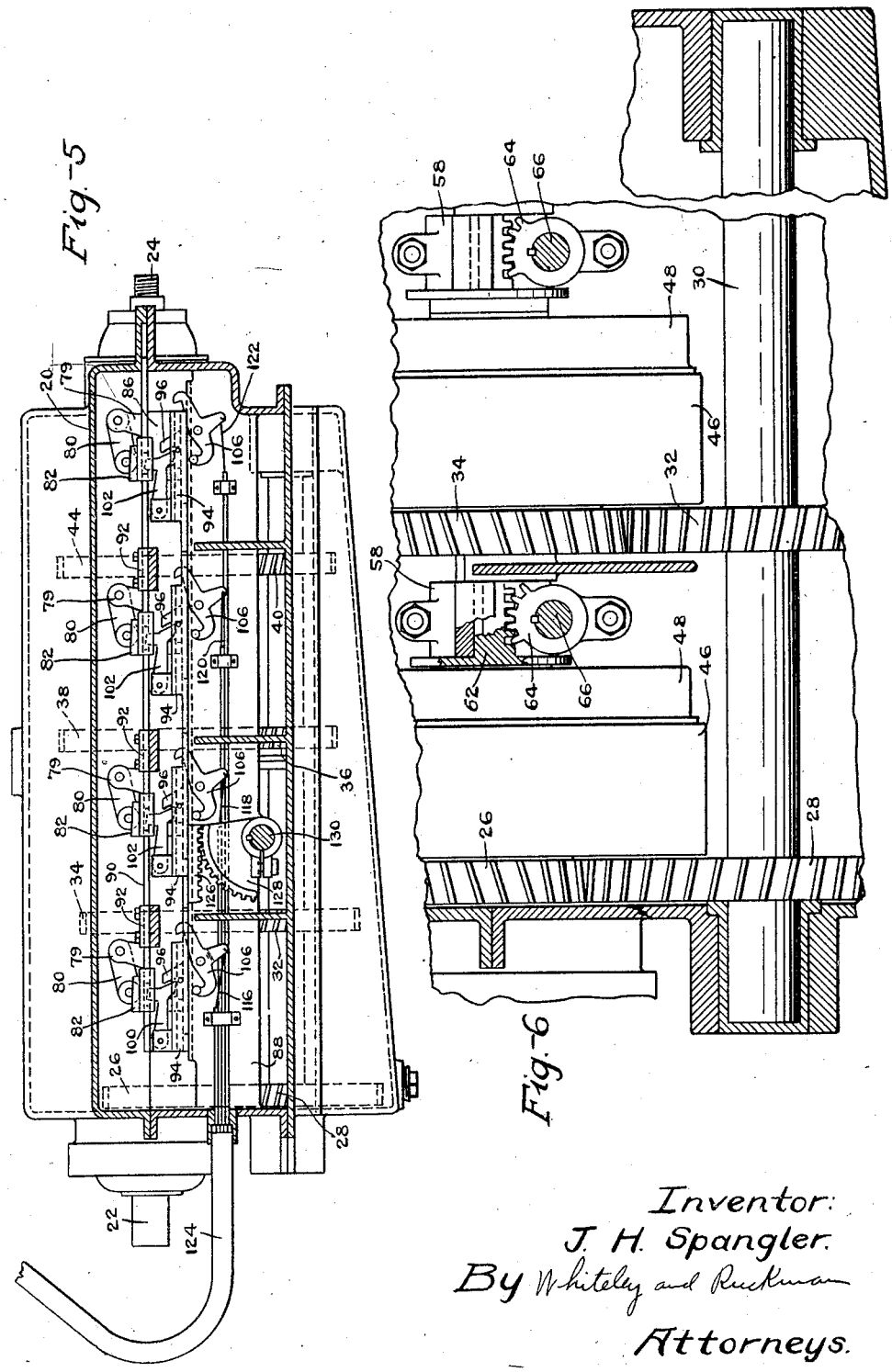

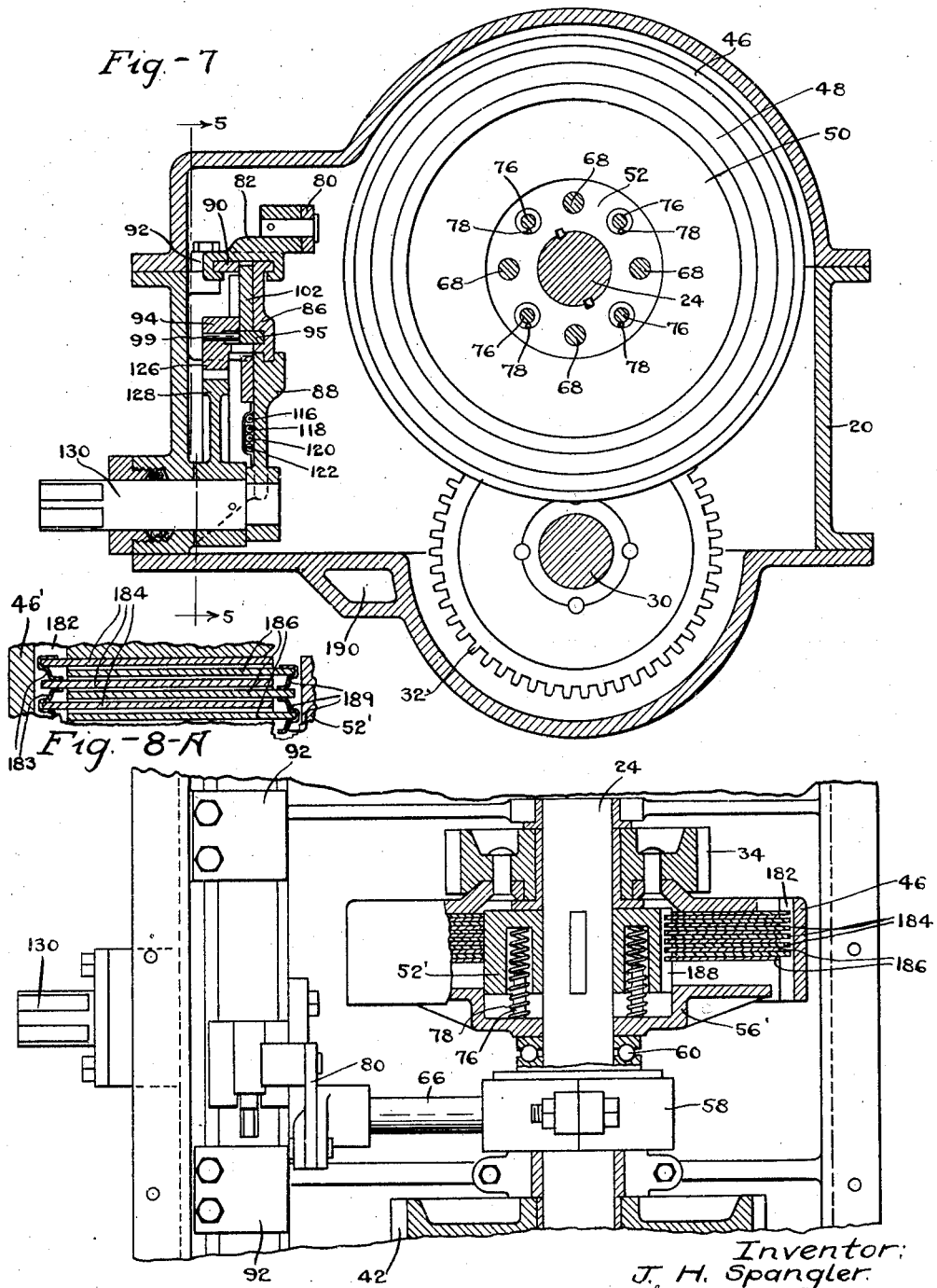

May 29, 1928.  
J. H. SPANGLER  
1,671,323

SPEED CONTROL DEVICE FOR MOTOR VEHICLES

Filed May 4, 1925     7 Sheets-Sheet 4

Inventor:  
J. H. Spangler.  
By Whiteley and Ruckman  
Attorneys.

May 29, 1928.  1,671,323
J. H. SPANGLER
SPEED CONTROL DEVICE FOR MOTOR VEHICLES
Filed May 4, 1925    7 Sheets-Sheet 5

Inventor
J. H. Spangler.
By Whiteley and Ruckman
Attorneys.

May 29, 1928.  J. H. SPANGLER  1,671,323
SPEED CONTROL DEVICE FOR MOTOR VEHICLES
Filed May 4, 1925    7 Sheets-Sheet 6

Inventor:
J. H. Spangler.
By Whiteley and Ruckman
Attorneys.

May 29, 1928.  1,671,323
J. H. SPANGLER
SPEED CONTROL DEVICE FOR MOTOR VEHICLES
Filed May 4, 1925    7 Sheets-Sheet 7
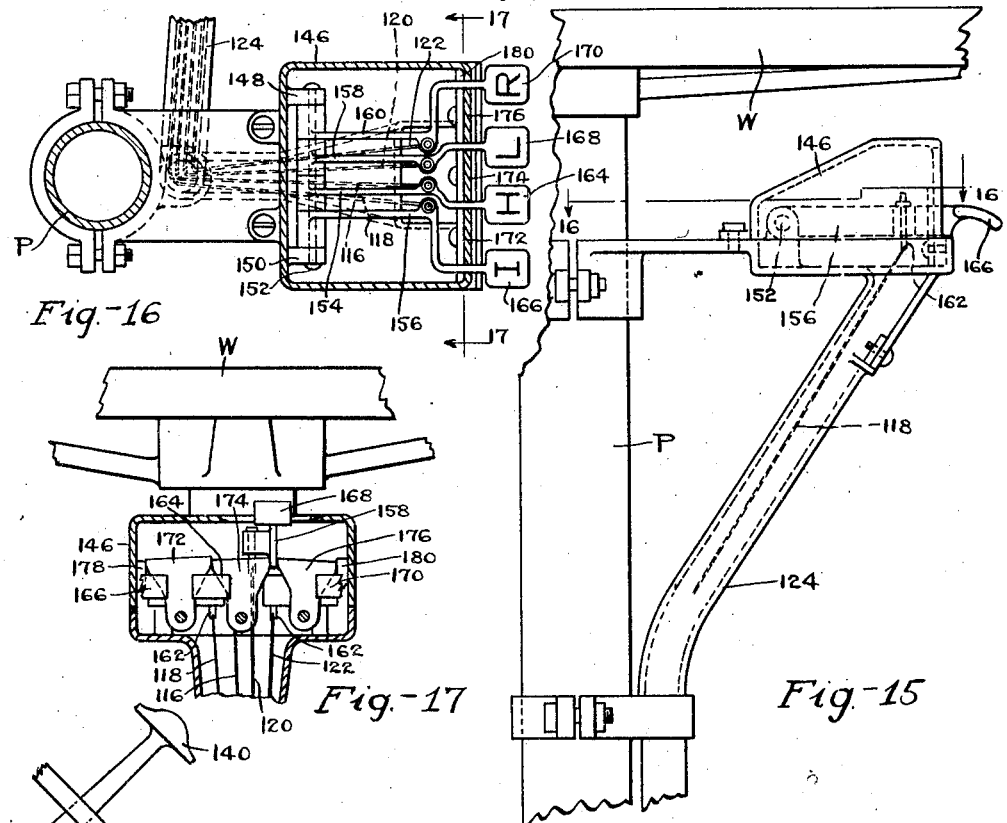
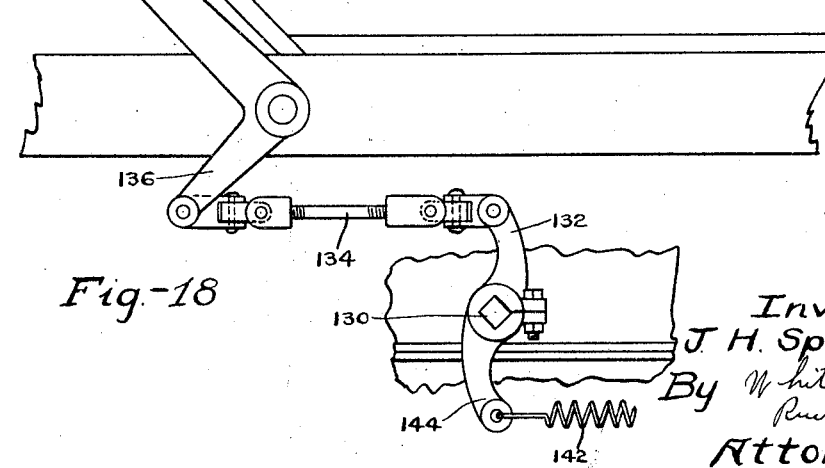
Inventor:
J. H. Spangler.
By Whiteley and Ruckman
Attorneys.

Patented May 29, 1928.

1,671,323

UNITED STATES PATENT OFFICE.

JOHN H. SPANGLER, OF MINNEAPOLIS, MINNESOTA.

SPEED-CONTROL DEVICE FOR MOTOR VEHICLES.

Application filed May 4, 1925. Serial No. 27,764.

My invention relates to speed control devices for motor vehicles and an important object of the invention is to provide a device by means of which different speeds and reverse may be selectively obtained without shock or jar and without liability of stripping gears. I accomplish the objects of my invention by providing a construction in which no shifting of gears is involved but in which clutch mechanisms for the various speeds and for reverse are operated by the driver according to the manner in which he wishes to operate the vehicle.

The full objects and advantages of my invention will appear in connection with the detailed description thereof and the novel features embodied in my inventive idea will be particularly pointed out in the claims.

Figure 9:
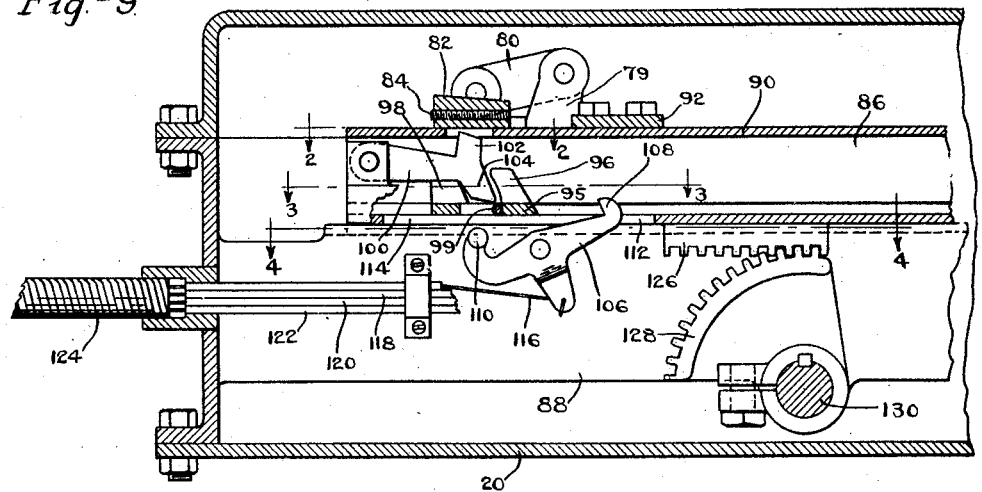
Figure 10:
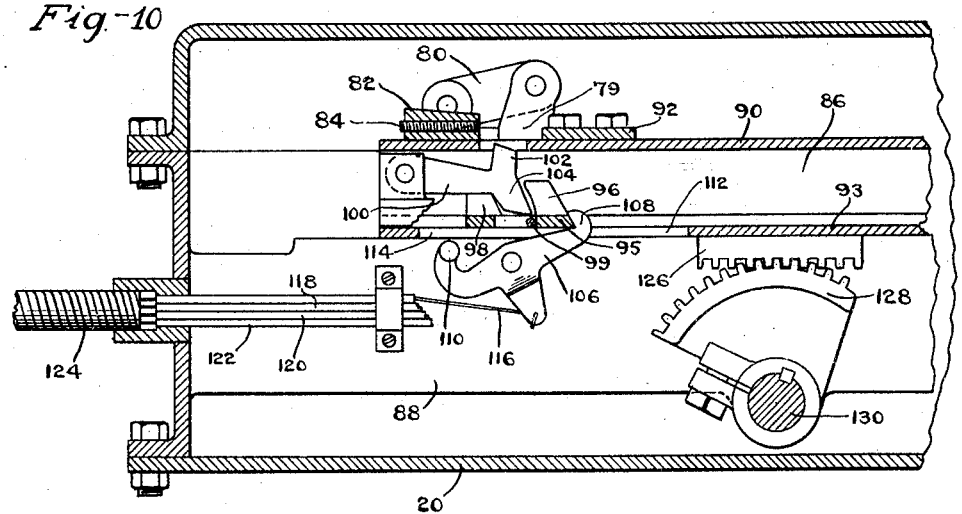
Figure 11:
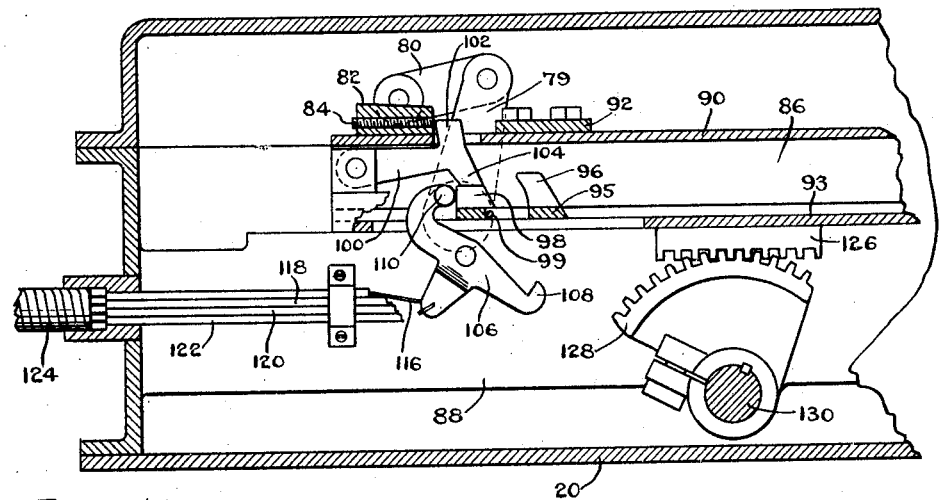
Figure 12:
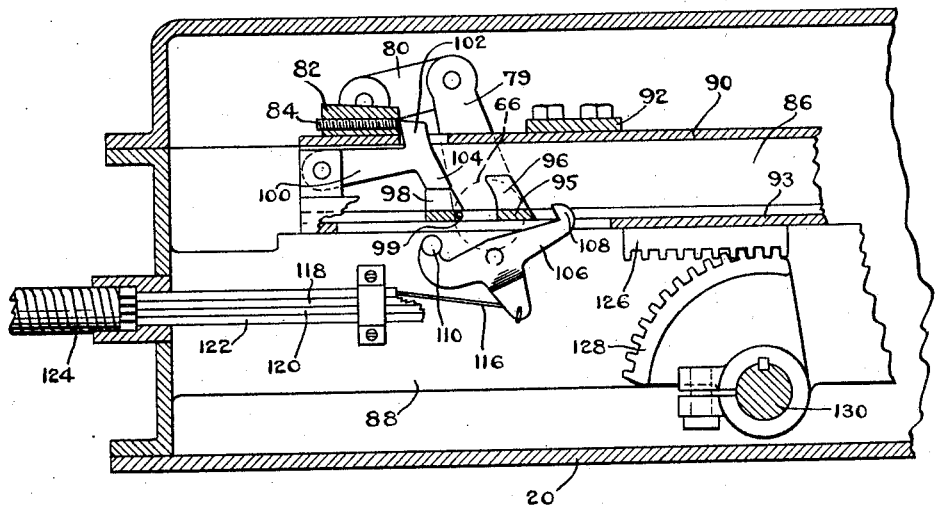
Figure 13:
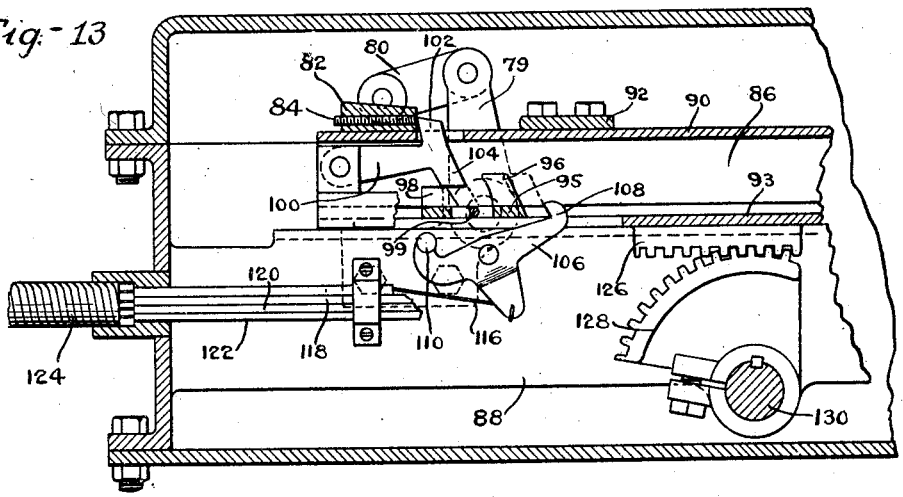
Figure 14:
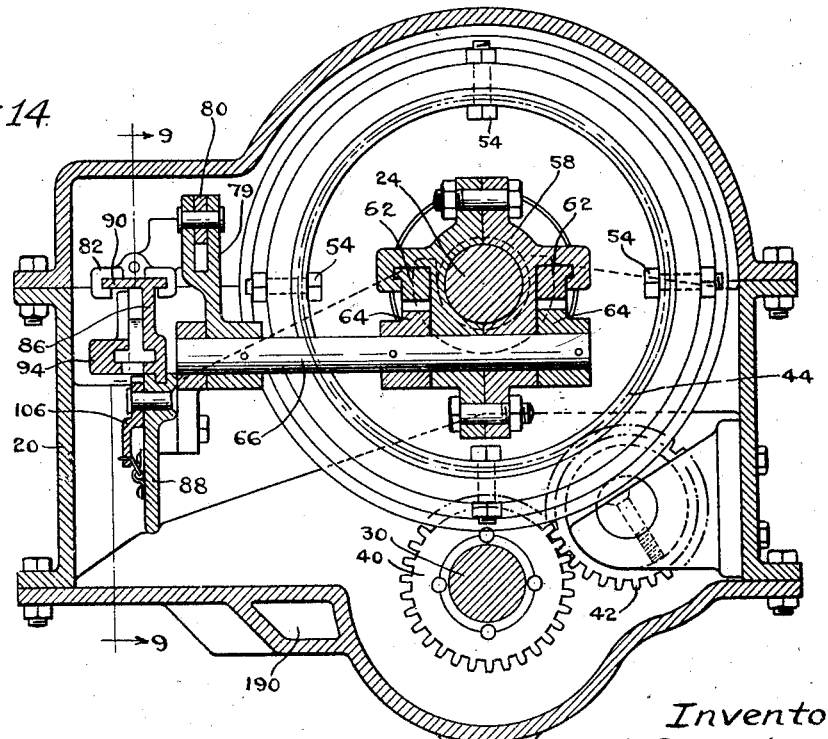

In the accompanying drawings which illustrate a practical embodiment of my invention, Fig. 1 is a top plan view of the transmission with a portion in horizontal section. Fig. 2 is a view in section on the line 2—2 of Fig. 9, Fig. 3 is a view in section on the line 3—3 of Fig. 9 and partly broken away to show a pin. Fig. 4 is a view in section on the line 4—4 of Fig. 9. Fig. 5 is a view in section on the line 5—5 of Fig. 7. Fig. 6 is an enlarged view in section on the line 6—6 of Fig. 1. Fig. 7 is an enlarged cross-sectional view on the line 7—7 of Fig. 1. Fig. 8 is an enlarged fragmentary view showing a modified form of clutch. Fig. 8^A is a view thereof showing separating springs. Fig. 9 is a view in vertical section on the line 9—9 of Fig. 14, showing the neutral position when the foot pedal is up. Fig. 10 is a view similar to Fig. 9, the foot pedal being down and a dog being ready to be lifted. Fig. 11 is a similar view, the foot pedal still being down and a finger operated lever having been pulled up and the dog moved up for engagement with a slide. Fig. 12 is a similar view, the foot pedal having been released and the clutch having been operated. Fig. 13 is a similar view, the foot pedal having been moved sufficiently to release the clutch but not sufficiently to release the dog. Fig. 14 is a view in cross section on the line 14—14 of Fig. 1. Fig. 15 is a fragmentary side elevational view of the steering post with finger operated levers mounted thereon. Fig. 16 is a view in section on the line 16—16 of Fig. 15. Fig. 17 is a view mostly in section on the line 17—17 of Fig. 16. Fig. 18 is an elevational view showing the connection of the foot pedal with the transmission device.

Referring to the construction shown in the drawings, the numeral 20 designates in general a transmission casing in the forward end of which is a ball bearing 21 within which the rear enlarged end of the motor shaft 22 rotates. A rearwardly projecting drive shaft 24 is rotatably mounted in a ball bearing 25 carried by the rear of the casing and this latter shaft extends forwardly through the casing and has its front end rotatably mounted in roller bearings 27 located in a recess in the rear end of the motor shaft 22 as shown in Fig. 1. Fixed upon the rear end of the motor shaft 22 within the transmission casing is a small gear 26 which meshes with a large gear 28 secured to a countershaft 30 rotatably mounted in the lower portion of the transmission casing. Secured to the shaft 30 is a second gear 32 which meshes with an intermediate speed gear 34 loosely mounted on the shaft 24. A third gear 36 is secured to the shaft 30 and this gear meshes with a slow speed gear 38 loosely mounted on the shaft 24. Secured to the shaft 30 is a fourth gear 40 meshing with an idler gear 42 as shown in Fig. 14 which in turn meshes with a reversing gear 44 loosely mounted on the shaft 24. The gears 26, 34 and 38 on the drive shaft 24 are progressively larger while the gears 28, 32 and 36 on the countershaft 30 are progressively smaller as is indicated in Fig. 5. The gears 38 and 44 are shown as being of the same size while the gears 36 and 40 are shown as being of the same size. All of these gears are preferably spiral gears as shown. It will be understood that when the device is in neutral position, the motor shaft 22 will rotate without imparting any rotation to the rear drive shaft 24. For high speed, the shaft 22 is clutched directly to the shaft 24. For intermediate speed, the gear 34 is clutched to the shaft 24. For slow speed, the gear 38 is clutched to the shaft 24 while for reverse, the gear 44 is clutched to the shaft 24. Similar clutching mechanisms are employed in each case and the clutching mechanism will now be described in detail with reference more particularly to the high speed control shown in section in Fig. 1 and the same reference characters will be employed so far as applicable for the other speed controls. A drum 46 is secured to the end of the motor shaft 22 adjacent the gear 26, the interior surface of the rim of this drum being coned to constitute one member of a cone clutch. Arranged for co-operation with this clutch member is a second coned clutch member 48 which is threaded upon the periphery of a flanged annular member 50 having a hub 52 splined on the shaft 24. The clutch member 48 is provided with a number of slots through which pass bolts 54 which also pass through holes in the threaded flange of the member 50, so that adjustment of the clutch member 48 may be made. Mounted on the shaft 24 are two spaced thrust members 56 and 58 between which is a ball bearing device 60. The member 56 rotates with the shaft and with the hub 52 while the member 58 is stationary so that the shaft 24 rotates therein. The member 58 slidably supports a pair of racks 62 in the manner best shown in Figs. 6 and 14, these racks engaging with segmental gears 64 secured to a rock shaft 66 which is operated in a manner to be referred to later. By referring to Fig. 1, it will be seen that the forward ends of the racks 62 engage a disk which forms part of the ball bearing device 60 so that thrust exerted by the racks will be communicated to the member 56 in order to bring the clutch member 48 into clutching engagement with the clutch member 46 by means of the mechanism now to be described. By referring to Figs. 1 and 7, it will be seen that there are a number of studs 68 which project forwardly from the member 56 and fit slidably in channels in the hub 52 and that these studs have rounded depressions into which fit the rounded inner ends of radially arranged levers 70 which are intermediately pivoted to ears 72 carried by the front face of the member 50. The outer ends of the levers 70 are pivotally attached to the rear ends of links 74 whose front ends are pivotally attached to the web portion of the drum 46. When the studs 68 are moved forwardly, the clutch member 48 will be drawn into clutching engagement with the clutch member 46. In order to normally hold the thrust member 56 rearwardly, it is provided with a number of pins 76 which project from its front face these pins being encircled by coiled springs 78 which bear against the member 56 at their rear ends and at their front ends extend into recesses in the hub 52. The rock shaft 66 previously referred to has a rocker arm 79 which is connected by a link 80 with a slide 82 shown in cross section in Fig. 7 and in longitudinal section in Fig. 9. It will be understood that there are four of these slides, one associated with each of the four clutching mechanisms. A screw 84 extends lengthwise through the slide 82, in order that an adjustable engagement may be provided for a dog which will be presently referred to. The slides 82 are slidable on a bar 86 which extends for the greater portion of the length of the casing, this bar being in turn slidable upon a fixed bar 88 secured within the casing. The slidable bar 86 is angular in cross section as shown in Figs. 7 and 14, having a top horizontal flange 90 upon which the slides 82 rest and the body portion of the bar being offset toward the bottom and fitting in a groove in the top of the fixed bar 88 so that this groove constitutes a slideway. The bar 86 is held in place by strips 92 secured to the casing and engaging the upper surface of the flange 90. The bar 86 is provided near its bottom with 4 lateral projections 94 spaced along the length thereof and connected therewith by webs 93 as seen in Figs. 3 and 13. These projections 94 co-operate with the body portion of the bar to form slideways for four slides 95 each having an upward projection 96 at the rear end and an upward projection 98 at the front end. It will be noted that the lateral projections 94 carry pins 99 which project into cut-out portions of the slides so as to be capable of engaging either the front or rear wall of the cut-out portion as is apparent from Figs. 10 and 11. Four dogs 100 are pivoted to the bar 86 and these dogs have upward projections 102 which when the dogs are lifted, are caused to project through slots in the flange 90 of the bar 86 and engage the end of the screws 84 provided said slots are not covered by the slides 82. The dogs 100 also have downward projections 104 which are engaged by the projections 98 when the slides are moved rearwardly. In order to move the slides 95, four levers 106 are intermediately pivoted to the fixed bar 88. The rear arm of each lever has a narrow upward projection 108 and the forward arm has a wide projection 110. By referring to Fig. 3, it will be seen that the web 93 contains a slot, the rear portion 112 of which is narrow and the forward portion 114 of which is broader. The wide projection 110 can be moved up through the wide portion 114 but not through the narrow portion 112 although the narrow projection 108 can be moved up through the narrow portion of the slot. The levers 106 normally occupy the position shown in Fig. 9. In order to rock the levers 106, wires are attached to downwardly extending lugs carried by the levers. A wire 116 is attached to the lever 106 associated with the high speed control, a wire 118 is attached to the lever associated with the intermediate speed control. A wire 120 is attached to the lever associated with the slow speed control, while a wire 122 is attached to the lever associated with the reverse. These wires are suitably supported and are placed in a tube 124 which extends forwardly and carries the wires to a position in easy reach of the driver, as will be explained later. The slidable bar 86 normally occupies a forward position as shown in Fig. 9. In order to slide it rearwardly, it is provided with a downwardly extending rack 126 meshing with a segmental gear 128 secured to a shaft 130. The shaft 130 is engaged by the central portion of a lever whose upper arm 132 as shown in Fig. 18 is attached to the rear end of a link connection 134 whose forward end is attached to the lower arm 136 of a foot pedal whose upper arm 138 terminates in an enlargement 140 engageable by the foot of the driver. The foot pedal is normally held upwardly by a coiled spring 142 connecting the lower arm 144 of the lever previously referred to which engages the shaft 130, with any suitable fixed member. This same spring tends to hold the slidable bar 86 forwardly to the extent shown in Fig. 9. It will be understood that the four operating wires previously referred to extend forwardly in the tube 124 to a position in reach of the driver. The means for operating the wires is shown in Figs. 15, 16 and 17. Fig. 15 shows the steering wheel W secured to the top of the steering post P upon which is clamped a casing 146 projecting out from the rear of the post so as to be conveniently positioned for the driver. As shown in Fig. 16, the casing contains two lugs 148 and 150 between which extends a bolt 152 upon which the ends of four levers 154, 156, 158 and 160 are pivoted. As will be understood from Fig. 15, the intermediate portions of these levers carry attaching members 162 to which the four wires are respectively attached. Beyond the attaching members the two levers 154 and 158 are offset outwardly to a slight extent and the two outer levers 156 and 160 are offset outwardly to a much greater extent. The levers extend through the open rear of the casing 146 and terminate in widened finger pieces 164, 166, 168 and 170 which upon their upper faces bear the letters H, I, L and R to designate respectively high, intermediate, low and reverse. On account of the offsetting of the levers, the finger pieces do not interfere with each other. At the lower rear portion of the casing 146 is a flange to which three wedge-shaped members 172, 174 and 176 are pivoted. Outside the member 172, an inclined lug 178 is attached to the inside of the casing and outside the member 176, an inclined lug 180 is attached to the casing. These wedge members and lugs prevent more than one of the levers at a time occupying a raised position due to the fact that the levers pass between the lugs and the wedge members in succession. This will be clear from Fig. 17 in which the finger piece 168 for low speed is shown raised and the passage of the lever 158 to which this piece is attached between the members 174 and 176 has crowded the member 176 against the lug 180 while the member 174 is crowded against the member 172 and the member 172 is crowded against the lug 178. This prevents the upward movement of another lever until the lever 158 is lowered, whereupon any one of the other levers but only one at a time may be raised. A similar condition exists in regard to the lifting of all of the levers.

Figs. 8 and 8^A are views in horizontal section showing that multiple disks may be used instead of the cone clutches previously described, although the same operating mechanism is used for causing the clutching and unclutching action. The disks are shown in connection with the intermediate speed gear 34 to which a clutch drum is secured, this drum having a cylindrical rim 46' on the inside of which are grooves 182 into which fit projections on the periphery of a series of disks 184. Alternating with the disks 184 are smaller disks 186, whose inner edge is provided with projections which fit into grooves 188 formed in the periphery of a cylindrical member 52' keyed to the shaft 24.

As shown in Fig. 8^A, springs 183 may be placed over the projections of alternate disks 184 so as to work in the grooves 182 and springs 189 may be placed on the projections of alternate disks 186 so as to work in the grooves 188. These springs insure separation of the disks when they are not forced into clutching engagement.

It is obvious that when the thrust member 56' is operated by the same mechanism employed to operate the thrust member 56 as previously described, the disks will be forced together and a clutching action produced which causes the shaft 24 to be rotated by the rotation of the loose gear 34. Springs 78 also tend to normally separate the disks to cause unclutching. It will be noted from Figs. 7 and 14 that the transmission casing 20 is provided with a passage 190 through which exhaust gases from the motor may be passed to warm the oil in the casing.

The operation and advantages of my invention will be apparent in connection with the foregoing description. Referring first to Fig. 9 which represents the neutral position, it will be understood that the foot pedal is up and the bar 86 is in its left hand position due to the action of the spring 142. The finger pieces are down and none of the levers 106 can be operated since the wide end 110 thereof is underneath the narrow portion 112 of the slot in the web 93. The driver depresses the foot pedal and this moves the bar 86 toward the right into the position shown in Fig. 10, the extent of this movement being limited by the slide 95 coming into engagement with the upward projecting end 108 of the lever 106. The wide end 110 of this lever is now under the wide portion of the slot so that the lever can be rocked. The driver keeps his foot on the pedal and pushes up the desired one of the finger pieces. This moves the end 110 of the lever 106 upwardly and this end engages the slide 95 and moves it into the position shown in Fig. 11, the extent of movement of the slide being limited by the pin 99. The movement of the slide 95 causes its projection 98 to lift the dog 100 and the projecting end 102 thereof engages the rear of the slide 82. The driver then releases the foot pedal and the spring 142 causes the bar 86 to move back into its original position as shown in Fig. 12. But the dog 100 is held up in engagement with the slide 82 which is caused to move toward the left as shown in this latter figure and the rocker arm 79 is rocked thereby partially rotating the shaft 66 to which it is secured and causing the clutch to be operated in the manner previously described. It will be understood from the previous description that any one of the four levers but only one of them at a time may be thus operated to secure any one of the three speeds or reverse as desired. The finger piece is down at this time, but the parts will be maintained in the position shown in Fig. 12 until the foot pedal is again depressed. When this is done, the bar 86 is moved toward the right and the dog 100 being carried thereby drops with its projection 104 between the projections 96 and 98 of the slide 95 since the end 108 of the lever limits the movement of the slide and the bar can continue moving until the pin 99 engages the rear wall of the slot in the slide. This action allows the slide 82 to move into normal position and release the clutch. With the foot still on the pedal, any other finger piece may now be pushed up to secure any other speed or reverse. In case the driver instead of going into some other speed or into reverse, wishes to release the clutch temporarily and then pick up the same speed, he does not depress the foot pedal to the full extent, but depresses it only a slight amount so that the parts assume the position shown in Fig. 13. This moves the dog 100 far enough to the right to permit the slide 82 to also move to the right and allow the arm 79 to rock, but not far enough for the dog to drop off the projection 98. Therefore upon removing the foot from the pedal, the dog will again engage the slide 82 and the rock arm 79 is swung back into clutching position. With this mechanism, all shifting of gears with liability of stripping same is obviated and due to the fact that when any one of the various clutches is engaged, there will be slipping thereof momentarily, shocks and jars are avoided in starting, in changing speeds, and also in reverse. The speed of the drive member of the clutch is however quickly, altho gradually, imparted to the driven member of the clutch. The mechanism is easily and quickly operated by the driver by simple manipulation of the foot pedal and finger pieces so that he is relieved of the necessity of reaching forward to grasp and manipulate the customary gear shift lever now in common use.

I claim:

1. In a speed control device for motor vehicles having a motor shaft, a drive shaft and a foot pedal, the combination of a plurality of clutch mechanisms interposed between the motor shaft and the drive shaft, means connected with said clutch mechanisms for causing the rotation of the motor shaft to be transmitted in different manners to said drive shaft, movable members for causing clutching engagement of said clutching mechanisms, a sliding bar, slides mounted on said sliding bar, connections between said slides and said movable members for moving the latter, dogs pivoted to said sliding bar, a second set of slides mounted on said sliding bar and adapted to move said dogs for engagement respectively with said first set of slides, a fixed support, movable members carried by said fixed support adapted to move said second mentioned slides, a support mounted within reach of the driver, movable finger pieces mounted on said support corresponding to said clutch mechanisms, flexible elements connecting said finger pieces and said last mentioned movable members for selectively operating the latter, connections between said sliding bar and the foot pedal whereby depression of the latter moves said sliding bar rearwardly, and means normally holding said sliding bar in forward position.

2. In a speed control device for motor vehicles having a motor shaft, a drive shaft and a foot pedal, the combination of a plurality of clutch mechanisms interposed between the motor shaft and the drive shaft, means connected with said clutch mechanisms for causing the rotation of the motor shaft to be transmitted in different manners to said drive shaft, movable members for causing clutching engagement of said clutching mechanisms, rock shafts for moving said movable members, rock arms secured at their ends to said rock shafts, slides to which the other ends of said rock arms are secured, a sliding bar upon which said slides are mounted, a fixed support upon which said sliding bar is mounted, dogs pivoted to said sliding bar, a second set of slides mounted on said sliding bar and adapted to move said dogs for engagement with said first set of slides, levers pivoted to said fixed support adapted to move said second mentioned slides, a support mounted within reach of the driver, movable finger pieces mounted on said support corresponding to said clutch mechanisms, flexible elements connecting said finger pieces and said levers for selectively operating the latter, a movable member connected with said sliding bar, connections between said movable member and the foot pedal whereby depression of the latter moves said sliding bar rearwardly, and a spring normally holding said sliding bar in forward position.

3. In a speed control device for motor vehicles having a motor shaft, a drive shaft and a foot pedal, the combination of a plurality of clutch mechanisms interposed between the motor shaft and the drive shaft, means connected with said clutch mechanisms for causing rotation of the motor shaft to be transmitted in different manners to said drive shaft, supporting members within which the drive shaft rotates, racks slidably mounted in said supporting members for causing clutching engagement of said clutching mechanisms, gears meshing with said racks, rock shafts upon which said last mentioned gears are secured, rock arms secured at their ends to said rock shafts, slides to which the other ends of said rock arms are secured, a sliding bar having a slotted flange upon which said slides are mounted, a fixed bar upon which said sliding bar is mounted, dogs pivoted to said sliding bar and having projections adapted to be moved through the slots of said flange for engagement with said slides, said sliding bar having a slideway in its lower portion, slides mounted in said slideway having projections adapted to move said dogs, levers pivoted to said fixed bar adapted to move said last mentioned slides, a support mounted within reach of the driver, movable finger pieces mounted on said support corresponding to said clutch mechanisms, flexible elements connecting said finger pieces and said levers for selectively operating the latter, a rack secured to said sliding bar, a segmental gear meshing with said rack, a rock shaft upon which segmental gear is secured, connections between said rock shaft and the foot pedal whereby depression of the latter moves said sliding bar rearwardly, and a spring attached to said connections for normally holding said sliding bar in forward position.

4. In a speed control device for motor vehicles having a motor shaft, a drive shaft and a foot pedal, the combination of a countershaft parallel with the drive shaft, a small gear secured to the motor shaft, a gear secured to said countershaft in mesh with said small gear, an intermediate speed gear loosely mounted on the drive shaft, a gear secured to said countershaft in mesh with said intermediate speed gear, a slow-speed gear loosely mounted on the drive shaft, a gear secured to said counter shaft in mesh with said slow-speed gear, a reversing gear loosely mounted on the drive shaft, an idler gear meshing with said reversing gear, a gear secured to said countershaft in mesh with said idler gear, clutch members secured to said small gear, said intermediate speed gear, said slow-speed gear and said reversing gear, co-operating clutch members slidably mounted on the drive shaft adjacent said first mentioned clutch members, supporting members within which the drive shaft rotates, racks slidably mounted in said supporting members for moving said slidable clutch members into clutching engagement with said first-mentioned clutch members, gears meshing with said racks, rock shafts upon which said last-mentioned gears are secured, rock arms secured at their ends to said rock shafts, slides to which the other ends of said rock arms are secured, a sliding bar having a slotted flange upon which said slides are mounted, a fixed bar upon which said sliding bar is mounted, dogs pivoted to said sliding bar and having projections adapted to be moved through the slots of said flange for engagement with said slides, said sliding bar having a slideway in its lower portion, slides mounted in said slideway having projections adapted to move said dogs, levers pivoted to said fixed bar adapted to move said last mentioned slides, a support mounted within reach of the driver, movable finger pieces mounted on said support corresponding to said clutch mechanisms, flexible elements connecting said finger pieces and said levers for selectively operating the latter, a rack secured to said sliding bar, a segmental gear meshing with said rack, a rock shaft upon which said segmental gear is secured, connections between said rock shaft and the foot pedal whereby depression of the latter moves said sliding bar rearwardly, and a spring attached to said connections for normally holding said sliding bar in forward position.

5. In a speed control device for motor vehicles having a motor shaft, a drive shaft and a foot pedal, the combination of a plurality of clutch mechanisms interposed between the motor shaft and the drive shaft, means connected with said clutch mechanisms for causing the rotation of the motor shaft to be transmitted in different manners to said drive shaft, movable members for causing clutching engagement of said clutching mechanisms, a sliding bar, slides mounted on said sliding bar, connections between said slides and said movable members for moving the latter, dogs pivoted to said sliding bar, a second set of slides mounted on said sliding bar and adapted to move said dogs for engagement respectively with said first set of slides, a fixed support, movable members carried by said fixed support adapted to move said second slides, operating members corresponding respectively to said clutch mechanisms mounted within reach of the driver, connections between said operating members and said last mentioned movable members for selectively operating the latter, connections between said sliding bar and the foot pedal whereby depression of the latter moves said sliding bar rearwardly, and means normally holding said sliding bar in forward position.

6. In a speed control device for motor vehicles having a motor shaft, a drive shaft and a foot pedal, the combination of a plurality of clutch mechanisms interposed between the motor shaft and the drive shaft, means connected with said clutch mechanisms for causing the rotation of the motor shaft to be transmitted in different manners to said drive shaft, a plurality of operating mechanisms for causing clutching engagement of said clutching mechanisms respectively, a sliding bar, connections between said sliding bar and the foot pedal whereby depression of the latter moves said sliding bar rearwardly, means normally holding said sliding bar in forward position, movable members carried by said sliding bar which permit anyone of said operating mechanisms to be operated only when the foot pedal is fully depressed, and movable members carried by said sliding bar which when the foot pedal is partly depressed release the clutching engagement of the selected clutching mechanism and leave the selected operating mechanism in its operative position.

In testimony whereof I hereunto affix my signature.

JOHN H. SPANGLER.